United States Patent
Larsson et al.

(10) Patent No.: US 7,801,105 B2
(45) Date of Patent: Sep. 21, 2010

(54) SCHEDULING RADIO RESOURCES FOR SYMMETRIC SERVICE DATA CONNECTIONS

(75) Inventors: Anders Larsson, Stockholm (SE); Martin Lars Bäckstrom, Danderyd (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1035 days.

(21) Appl. No.: 11/288,436

(22) Filed: Nov. 29, 2005

(65) Prior Publication Data
US 2006/0268813 A1 Nov. 30, 2006

Related U.S. Application Data

(60) Provisional application No. 60/684,188, filed on May 25, 2005, provisional application No. 60/684,216, filed on May 25, 2005, provisional application No. 60/684,214, filed on May 25, 2005, provisional application No. 60/684,215, filed on May 25, 2005, provisional application No. 60/684,232, filed on May 25, 2005, provisional application No. 60/684,233, filed on May 25, 2005.

(51) Int. Cl.
*H04B 7/212* (2006.01)

(52) U.S. Cl. .................. 370/347; 370/352; 370/503; 370/468; 370/452.2

(58) Field of Classification Search .......... 370/227, 370/230, 347, 468, 503, 277; 455/450–452.2
See application file for complete search history.

(56) References Cited

U.S. PATENT DOCUMENTS

| | | |
|---|---|---|
| 5,987,032 A | 11/1999 | Nadgauda et al. |
| 6,282,192 B1 | 8/2001 | Murphy et al. |
| 6,493,541 B1 | 12/2002 | Gunnarsson et al. |
| 6,590,928 B1 | 7/2003 | Haartsen |
| 6,757,542 B2 | 6/2004 | Bruin et al. |
| 6,778,831 B1 | 8/2004 | Sancho et al. |
| 6,845,123 B1 | 1/2005 | Nyberg et al. |
| 6,868,080 B1 | 3/2005 | Umansky et al. |
| 6,882,847 B2 | 4/2005 | Craig et al. |

(Continued)

OTHER PUBLICATIONS

Related U.S. Appl. No. 11/298,939, filed Dec. 12, 2005, Inventors: Larsson et al.
Related U.S. Appl. No. 11/298,938, filed Dec. 12, 2005, Inventors: Larsson et al.
Related U.S. Appl. No. 11/314,973, filed Dec. 22, 2005, Inventors: Larsson et al.

(Continued)

*Primary Examiner*—Charles N Appiah
*Assistant Examiner*—Michael T Vu
(74) *Attorney, Agent, or Firm*—Nixon & Vanderhye P.C.

(57) ABSTRACT

Radio channel resources are allocated in a radio communications system based on whether a requested data communication requested is associated with a symmetric service or an asymmetric service. If the data communication is associated with a symmetric service, a symmetric connection between the mobile radio station and the radio network is established for communicating data packets associated with the data communication. Radio channel resources are assigned to the symmetric connection for transporting the data packets between the mobile radio station and the radio network. The symmetric connection is assigned substantially the same amount of radio channel resources in an uplink direction as in a downlink direction. In one example, the symmetric data communication is a voice over IP (VoIP) communication. One example environment is a GPRS/EDGE type system where the radio channel resources are time slots and the symmetric connection includes an uplink temporary block flow (TBF) and a downlink TBF.

16 Claims, 5 Drawing Sheets

U.S. PATENT DOCUMENTS

| | | | |
|---|---|---|---|
| 7,200,125 | B2 | 4/2007 | Lohtia et al. |
| 7,239,861 | B2 | 7/2007 | Holur |
| 7,336,957 | B2 | 2/2008 | Marinier et al. |
| 7,580,424 | B2 * | 8/2009 | Ravishankar et al. ....... 370/468 |
| 2001/0049790 | A1 | 12/2001 | Faccin et al. |
| 2002/0078214 | A1 | 6/2002 | Shindou et al. |
| 2002/0122406 | A1 * | 9/2002 | Chillariga et al. ........... 370/347 |
| 2002/0145988 | A1 | 10/2002 | Dahlman et al. |
| 2002/0172163 | A1 * | 11/2002 | Chen et al. .................. 370/281 |
| 2002/0181422 | A1 * | 12/2002 | Parantainen et al. ........ 370/337 |
| 2003/0026245 | A1 | 2/2003 | Ejzak |
| 2003/0095542 | A1 | 5/2003 | Chang et al. |
| 2003/0128694 | A1 | 7/2003 | Hundscheidt et al. |
| 2003/0156557 | A1 | 8/2003 | Kalden et al. |
| 2004/0057378 | A1 | 3/2004 | Gronberg |
| 2004/0085949 | A1 | 5/2004 | Partanen et al. |
| 2004/0246990 | A1 | 12/2004 | Krishnamurthi et al. |
| 2005/0047396 | A1 | 3/2005 | Helm et al. |
| 2005/0195762 | A1 | 9/2005 | Longoni et al. |
| 2006/0050680 | A1 | 3/2006 | Naim et al. |
| 2006/0140113 | A1 | 6/2006 | Anderlind et al. |
| 2006/0142011 | A1 | 6/2006 | Kallio |
| 2006/0211437 | A1 | 9/2006 | Yang |
| 2006/0250957 | A1 * | 11/2006 | Gielty et al. ................ 370/230 |
| 2007/0083470 | A1 | 4/2007 | Bonner et al. |

OTHER PUBLICATIONS

Related U.S. Appl. No. 11/346,565, filed Feb. 3, 2006, Inventors: Larsson et al.

Related U.S. Appl. No. 11/370,171, filed Mar. 8, 2006, Inventors: Larsson et al.

Office Action mailed Nov. 30, 2009 in co-pending U.S. Appl. No. 11/298,939.

Office Action mailed Jun. 8, 2009 in co-pending U.S. Appl. No. 11/298,939.

Office Action mailed May 29, 2009 in co-pending U.S. Appl. No. 11/298,938.

Office Action mailed Dec. 24, 2009 in co-pending U.S. Appl. No. 11/298,938.

Office Action mailed Aug. 21, 2008 in co-pending U.S. Appl. No. 11/370,171.

Office Action mailed Mar. 19, 2009 in co-pending U.S. Appl. No. 11/370,171.

Office Action mailed Nov. 3, 2009 in co-pending U.S. Appl. No. 11/370,171.

SIM Access; http://www.eurescom.; pp. 1-11.

3GPP TS 23.060 V5.2.0 (Jun. 2002); $3^{rd}$ Generation Partnership Project; Technical Specification Group Services and System Aspects; General Packet Radio Service (GPRS); Service description; Stage 2 (Release 5); http://www.3gpp.org.

3GPP TS 23.060 V3.14.0 (Dec. 2002), $3^{rd}$ Generation Partnership Project; Technical Specification Group Services and System Aspects; General Packet Radio Service (GPRS); Service description; State 2, pp. 1-193.

3GPP TR 23.806 V1.7.0 (Nov. 2005), Technical Specification Group Service and System Aspects; Voice Call Continuity between CS and IMS Study (Release 7).

Hamidian, K., et al. "Performance Analysis of a CDMA/FDMA Cellular Communication System with Cell Splitting," IEEE, 1997, pp. 545-550.

Kim, Won, S., et al., "Enhanced Capacity in CDMA Systems with Alternate Frequency Planning," IEEE, 1998, pp. 973-978.

Kang et al, "Adaptive QoS Control by Toggling Voice Traffic Between Circuit and Packet Cellular Networks", Globecom 2003, IEEE Global Telecommunications Conference, Conference Proceedings, San Francisco, Dec. 1-5, 2003, New York, NY, IEEE publ. Dec. 1, 2003, vol. 7, pp. 3498-3503.

International Search Report and Written Opinion mailed Oct. 10, 2006 in corresponding PCT application No. PCT/SE2006/050124.

Office Action mailed Mar. 24, 2010 in co-pending U.S. Appl. No. 11/314,973.

\* cited by examiner

SCHEDULING RADIO RESOURCES FOR SYMMETRIC SERVICE DATA CONNECTIONS

RELATED CASES

This application claims the benefit and priority of U.S. Provisional Patent Application 60/684,188, filed May 25, 2005, the entire contents of which is incorporated by reference in its entirety.

This application is related to the following related U.S. patent Applications Ser. No.:

60/684,216 entitled "GSM VoIP PS-to-CS Handover at Allocation to Frequency-Hopping Edge TRX," filed on May 25, 2005, and corresponding 10/298,939 entitled "Connection Type Handover Of Voice Over Internet Protocol Call Based On Resource Type," filed on Dec. 12, 2005, incorporated by reference.

60/684,214 entitled "GSM VoIP PS-to-CS Handover at Low-Quality Detection," filed on May 25, 2005, and corresponding 10/298,938 entitled "Connection Type Handover Of Voice Over Internet Protocol Call Based On Low-Quality Detection," filed on Dec. 12, 2005, incorporated by reference.

60/684,215 entitled "Local Switching AGC," filed on May 25, 2005, and corresponding 10/314,973 entitled "Local Switching of Calls Setup by a Multimedia Core Network," filed on Dec. 12, 2005, incorporated by reference.

60/684,232 entitled "Method to Improve VoIP Media Flow Quality by Adapting Speech Encoder and LQC Based on EDGE MCS," filed on May 25, 2005, and corresponding 10/346,565 entitled "Enhanced VoIP Media Flow Quality By Adapting Speech Encoding Based On Selected Modulation And Coding Scheme (MCS)," filed on Feb. 3, 2006 incorporated by reference.

60/684,233 entitled "Authenticated Identification of VoIP Flow in BSS," filed on May 25, 2005, and corresponding 11/370,171 entitled "Authentication of an Application Layer Media Flow Request for Radio Resources," filed on Mar. 8, 2006, incorporated by reference.

TECHNICAL FIELD

The present invention pertains to telecommunications and finds advantageous example application to Voice over Internet Protocol (VoIP) communications.

BACKGROUND

VoIP is the transport of voice traffic using the Internet Protocol (IP). In the mobile world, VoIP means using a packet-switched (PS) service for transport of Internet Protocol (IP) packets which contain, e.g., Adaptive Multi-Rate (AMR) codec speech frames for voice mobile phone calls. A packet-switched connection is often simply referred to as a data connection.

Circuit-switched networks use circuit switching for carrying voice traffic where the network resources are statically allocated from the sender to receiver before the start of the message transfer, thus creating a "circuit." The resources remain dedicated to the circuit during the entire message transfer and the entire message follows the same path. While this arrangement works quite well to transfer voice, IP is an attractive choice for voice transport for many reasons including lower equipment costs, integration of voice and data applications including multi-media like email, instant messaging, video, the world wide web, etc., lower bandwidth requirements, and the widespread availability of IP.

As VoIP becomes more accepted and commonplace, some users will likely upgrade from an existing circuit-switched phone to a VoIP phone. It is likely that each such upgrading user will bring a benefit for the operator in terms of increased hardware efficiency.

In packet-switched networks, the message is broken into packets, each of which can take a different route to the destination where the packets are recompiled into the original message. The packet switched (PS) service utilized for VoIP can be, for example, GPRS (General Packet Radio Service), EDGE (Enhanced Data Rates for Global Evolution), or WCDMA (Wideband Code Division Multiple Access). Each of these example services happen to be built upon the Global System for Mobile communications (GSM), a second generation ("2G") digital radio access technology originally developed for Europe. GSM was enhanced in 2.5G to include technologies such as GPRS. The third generation (3G) comprises mobile telephone technologies covered by the International Telecommunications Union (ITU) IMT-2000 family. The Third Generation Partnership Project (3GPP) is a group of international standards bodies, operators, and vendors working toward standardizing WCDMA-based members of the IMT-2000.

EDGE (or Enhanced Data Rates for Global Evolution) is a 3G technology that delivers broadband-like data speeds to mobile devices. EDGE allows consumers to connect to the Internet and send and receive data, including digital images, web pages and photographs, three times faster than possible with an ordinary GSM/GPRS network. EDGE enables GSM operators to offer higher-speed mobile-data access, serve more mobile-data customers, and free up GSM network capacity to accommodate additional voice traffic. EDGE uses the same TDMA (Time Division Multiple Access) frame structure, logical channels, and 200 kHz carrier bandwidth as GSM networks, which allows existing cell plans to remain intact.

In EDGE technology, a base transceiver station (BTS) communicates with a mobile station (e.g., a cell phone, mobile terminal or the like, including computers such as laptops with mobile termination). The base transceiver station (BTS) typically has plural transceivers (TRX). A time division multiple access (TDMA) radio communication system like GSM, GPRS, and EDGE divides the time space into time slots on a particular radio frequency. Time slots are grouped into frames, with users being assigned one or more time slots. In packet-switched TDMA, even though one user might be assigned one or more time slots, other users may use the same time slot(s). So a time slot scheduler is needed to ensure that the time slots are allocated properly and efficiently.

Traditionally, time slots for data packet connections are allocated assuming an asymmetry between the uplink (mobile-to-network) and downlink (network-to-mobile). Thus, time slot allocation schemes have been used that optimize for that asymmetry. Example asymmetric data packet connections include: File Transfer Protocol FTP downloading (asymmetric in the downlink), web page download (downlink), streaming download (asymmetric in the downlink), multimedia messaging services (MMS) (asymmetric in the downlink for reception and asymmetric in the uplink for sending), and ping-pong type services (asymmetric first in the uplink, then asymmetric in the downlink). Example asymmetric scheduling methods for GPRS include "Weighted Round Robin" and "Virtual Clock Multiplexing." In contrast, VoIP service is symmetrical in the downlink and uplink. Because current radio resource/channel allocation schemes are tailored for asymmetrical services, they are not optimal for symmetrical services like VoIP.

SUMMARY

Radio channel resources are allocated in a radio communications system based on whether a requested data communication is associated with a symmetric service or an asymmetric service. If the data communication is determined to be associated with a symmetric service, a symmetric connection between the mobile radio station and the radio network is established for communicating data packets associated with the data communication. Radio channel resources are assigned to the symmetric connection for transporting the data packets between the mobile radio station and the radio network using a symmetric connection based allocation scheme which is different from an asymmetric connection based allocation scheme. In a preferred, non-limiting, example embodiment, the symmetric connection is assigned substantially the same amount of radio channel resources in an uplink direction as in a downlink direction.

The amount of radio resources assigned in both the uplink and downlink directions may be is limited, even though the mobile radio station has a capability for transmitting or receiving using more radio resources than the limited amount assigned. In one non-limiting example, the symmetric data communication is a Voice over IP (VoIP) communication. One example environment is a GPRS/EDGE type system where the radio channel resources are time slots and the symmetric connection includes an uplink temporary block flow (TBF) and a downlink TBF.

For multiple symmetric communications, timeslots are scheduled for the symmetric communications taking into account that substantially the same amount of radio channel resources will be used in the uplink direction as in the downlink direction. One way to do this is to use a "pairing" approach where time slots are reserved and allocated for pairs of VoIP users. For example, a first VoIP data communication in a pair may be assigned a first time slot A in which to transmit and a second time slot B in which to receive, and a second VoIP data communication in the pair may be assigned the first time slot A in which to receive and the second time slot B in which to transmit.

In addition, radio conditions associated with at least one of the uplink and downlink data flows of a VoIP communication may be determined and taken into account. For example, the number of timeslots to be assigned to both the uplink and downlink based on the determined radio condition. For a pair of VoIP communications having a superior determined radio condition, one time slot is assigned in each direction, and for a pair of VoIP communications having an inferior determined radio condition, two time slots are assigned in each direction.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
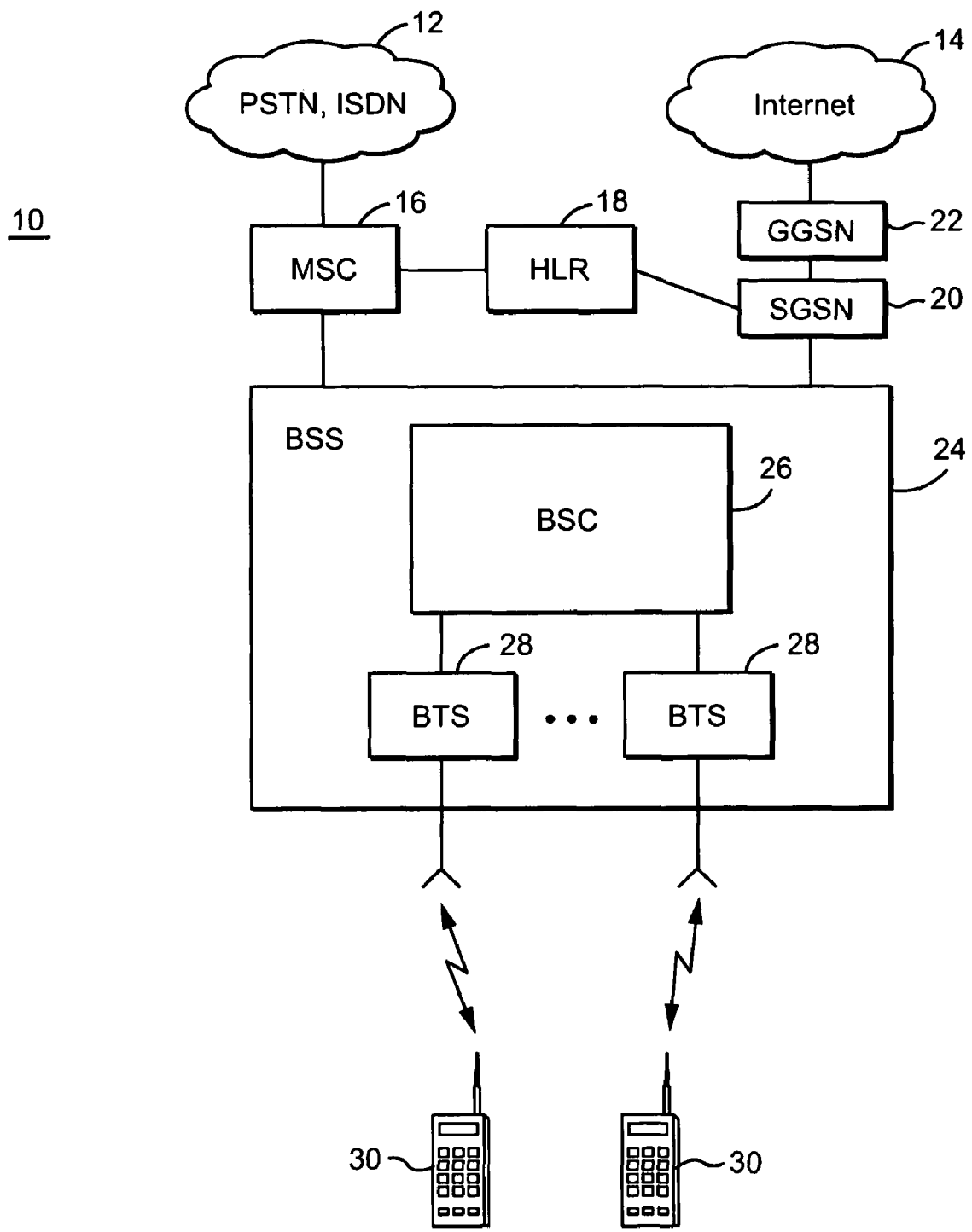
FIG. 1 is a simplified function block diagram of an example mobile radio communications system.

FIG. 1 shows an example non-limiting mobile radio communications system 10 that couples to one or more circuit-switched networks 12 like the Public Switched Telephone Network (PSTN) and/or the Integrated Services Digital Network (ISDN), etc. via a mobile switching center (MSC) 16 core network node and to one or more packet-switched networks 14 like the Internet via a serving GPRS support node (SGSN) 20 and a gateway GPRS support node (GGSN) 22. The MSC 16 and SGSN 20 are coupled to a mobile subscriber database like a home location register (HLR) 18 and to a radio access network. In this example, the radio access network is GSM-based and is therefore referred to as a base station system (BSS) 24. The BSS 24 includes one or more base station controllers (BSCs) 26 (only one is illustrated) coupled to plural base transceiver stations (BTSs) 28. For simplicity, details of the base station controller (BSC) 26 are omitted. The base station controllers 26 control radio resources and radio connectivity for the cells served by the BTSs under its control. The BTSs communicate with mobile radio stations (MSs) 30 using radio frequency communication over an air interface. Each base transceiver station (BTS) 28 serves one or more cells. For each served cell, the base transceiver station 28 provides a pool of radio transmission resources (typically managed and allocated by the BSC) for communicating with mobile stations in that cell. Each base station (BTS) 28 includes a controller as well as radio transceivers and baseband processing circuitry to handle the radio transmission and reception within each served cell.

Each mobile station (MS) 30 includes a radio transceiver and data processing and control unit functionalities for providing a Voice over Internet Protocol (VoIP) capability. The person skilled in the art will recognize that the mobile station 30 and its data processing and control unit typically include numerous other functionalities and applications. The mobile also includes input/output devices such as a display screen, a keypad, a speaker, a microphone, and the like.

Figure 2:
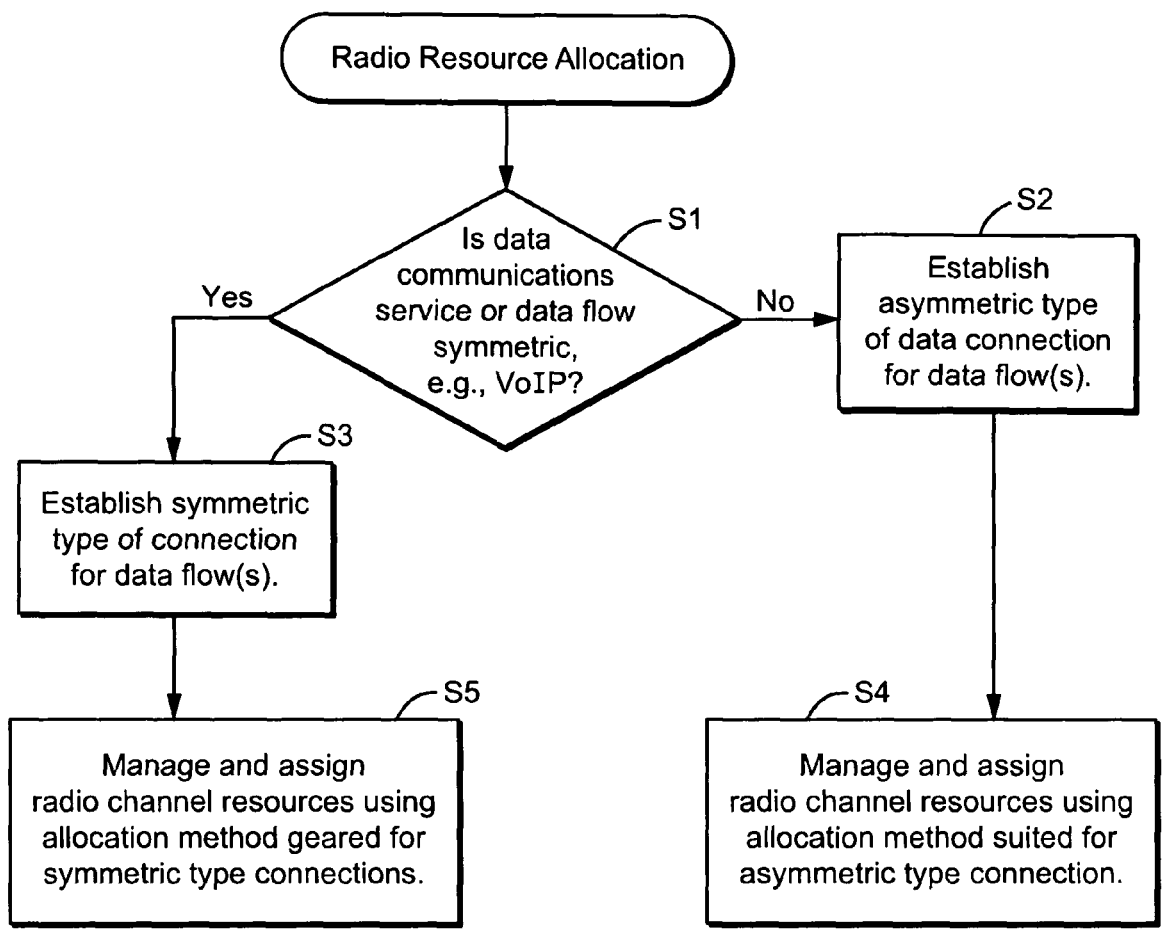
FIG. 2 is a flowchart showing example non-limiting steps or actions performed by a radio resource assignment controller to assign radio resources based on whether the requested data connection is determined to be symmetric or asymmetric.

FIG. 2 is a flowchart diagram that illustrates example steps for allocating radio resources depending on the type of data connection. A decision is made in step S1 whether the requested data communications service or data flow is symmetric or asymmetric. An example of a symmetric service is Voice over Internet Protocol (VoIP). One example way to detect whether a data flow is a VoIP data flow is to check its conversational quality of service bit. If the conversational bit is set, then the data flow is determined to be a symmetric VoIP data flow.

For asymmetric services, asymmetric data connections are established for the data flows (step S2). Radio channel resources are managed and assigned using traditional or other methods/algorithms suited for asymmetric type connections, which is the normal case today (step S4). For symmetric services, a symmetric data connection is established for the data flow(s) (step S3). Radio channel resources are managed and assigned using methods/algorithms tailored for symmetric type connections (step S5). A non-limiting example of how radio channel resources can be allocated for a symmetric data service is described below in the context of a GPRS/EDGE type system for VoIP. But it will be appreciated that the invention is not limited to this example or to any specific details pertaining to this example.

Figure 3:
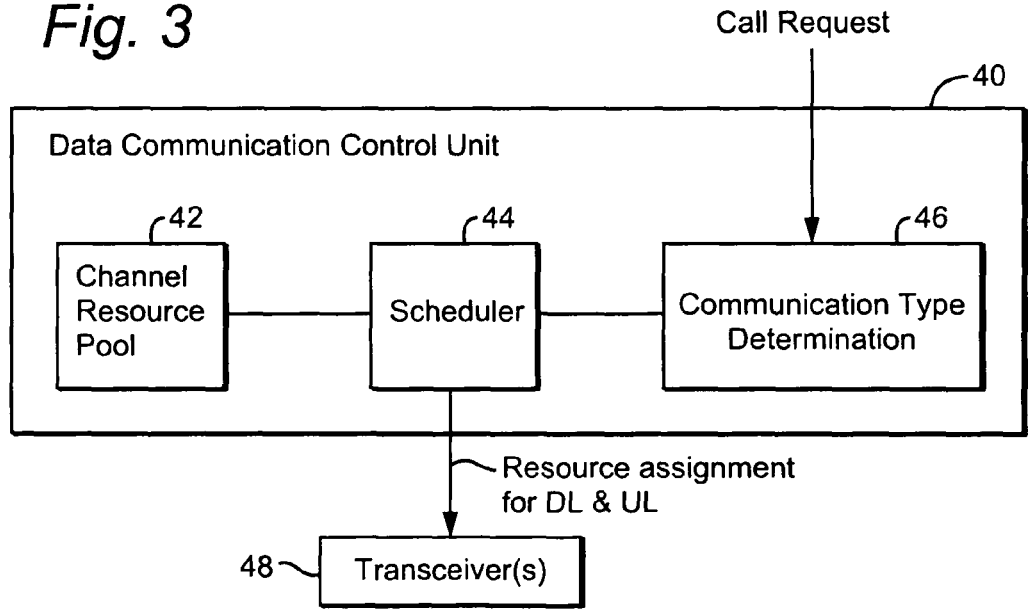
FIG. 3 is a simplified function block diagram of a non-limiting example data communications control unit for implementing the flowchart steps or actions outlined in FIG. 2.

FIG. 3 illustrates a function block diagram for implementing the steps outlined in FIG. 2. A data communication control unit 40, which could be implemented in any suitable radio network node such as a base station controller, a base station, a core network node, etc., includes a channel resource pool 42 for one or more cells, a radio resource scheduler 44, and a connection type determiner 46. Although illustrated as separate blocks, the functions of these blocks may be performed by one or any number of processing entities. The connection type determiner 46 receives a call request and determines whether the requested data connection is an asymmetric or a symmetric type data connection/service. Based on that type determination, the scheduler 44 implements a radio resource allocation scheme tailored for that type. The scheduler 44, for example, may allocate certain ones of the resources in the pool 42 in a certain way, e.g., using a particular algorithm, pattern, etc. The resource assignment for the uplink and downlink data flows in the connection is then communicated to the base station radio transceiver(s) 48 and to the mobile stations to commence the requested radio communication.

Figure 4:
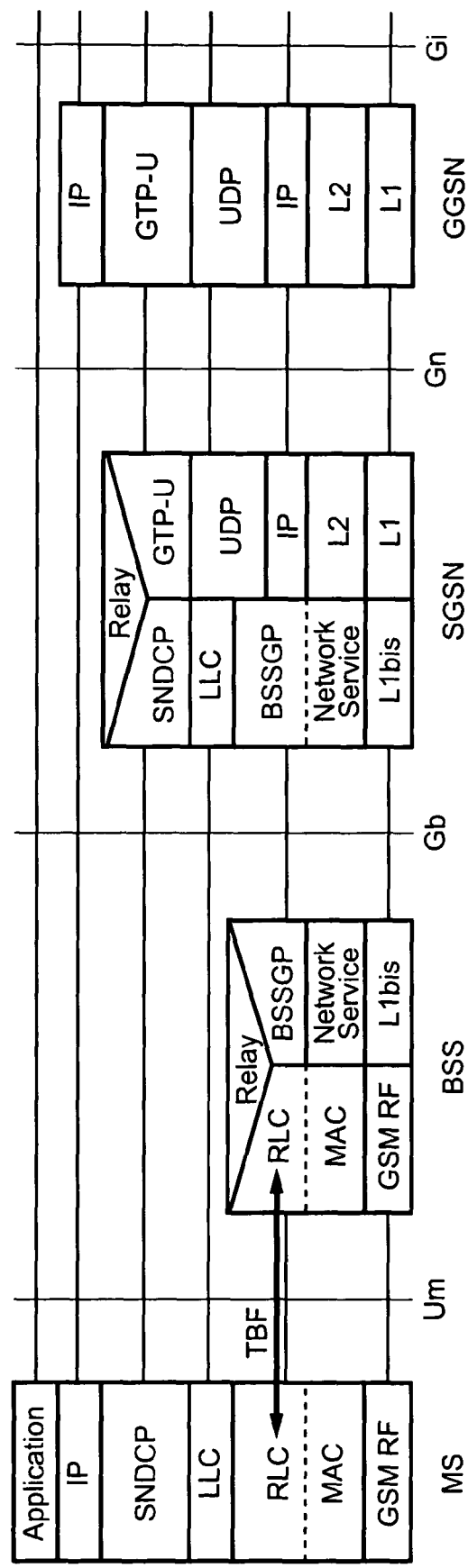
FIG. 4 is a communications protocol diagram of an EDGE (Enhanced Data Rates for Global Evolution) system.

Further illustrative details are provided in the context of a non-limiting example implementation for Voice over Internet Protocol (VoIP) packet flows. In EDGE, EGPRS, or GPRS, a first link layer protocol context, called a temporay block flow (TBF), is set up uplink from the mobile to the radio network, and a second TBF is set up downlink from the radio network to the mobile radio. A TBF can be viewed as a logical connection between a mobile station (MS) and a packet control unit (PCU) in the network, e.g., the BSS. FIG. 4 is a communications protocol diagram of an EDGE system familiar to those skilled in the art. The TBF is shown as a temporary connection between the radio link control (RLC) protocol layer entities in the BSC and the MS. Once an uplink TBF and a downlink TBF have been established for a data connection, then radio resources (time slots in the EDGE type systems) can be assigned to support the connection over the radio/air interface. Base station controller (BSC) 26 relays the LLC frames (depicted as "Relay" on BSS in FIG. 4) between the mobile station (MS) 30 and the core network. The media access control (MAC) layer manages the multiplexing of data blocks arising from various TBFs which are active the available physical radio channel, arbitrating among the various mobile users via a time slot scheduling mechanism orchestrated in the BSC where a TBF is selected for each time slot.

When a user has data information to transport, a TBF is established and divided into a number of radio blocks each including four bursts on a particular channel in four consecutive TDMA frames. A PSET is defined as a number of physical packet data channels (PDCH) in the TDMA frame assigned to packet switching users on a radio frequency. The remaining time slots in the frame are used for circuit-switched traffic and control information. Each user gets a reservation by selecting a the PSET for its TBFs.

Figure 5:
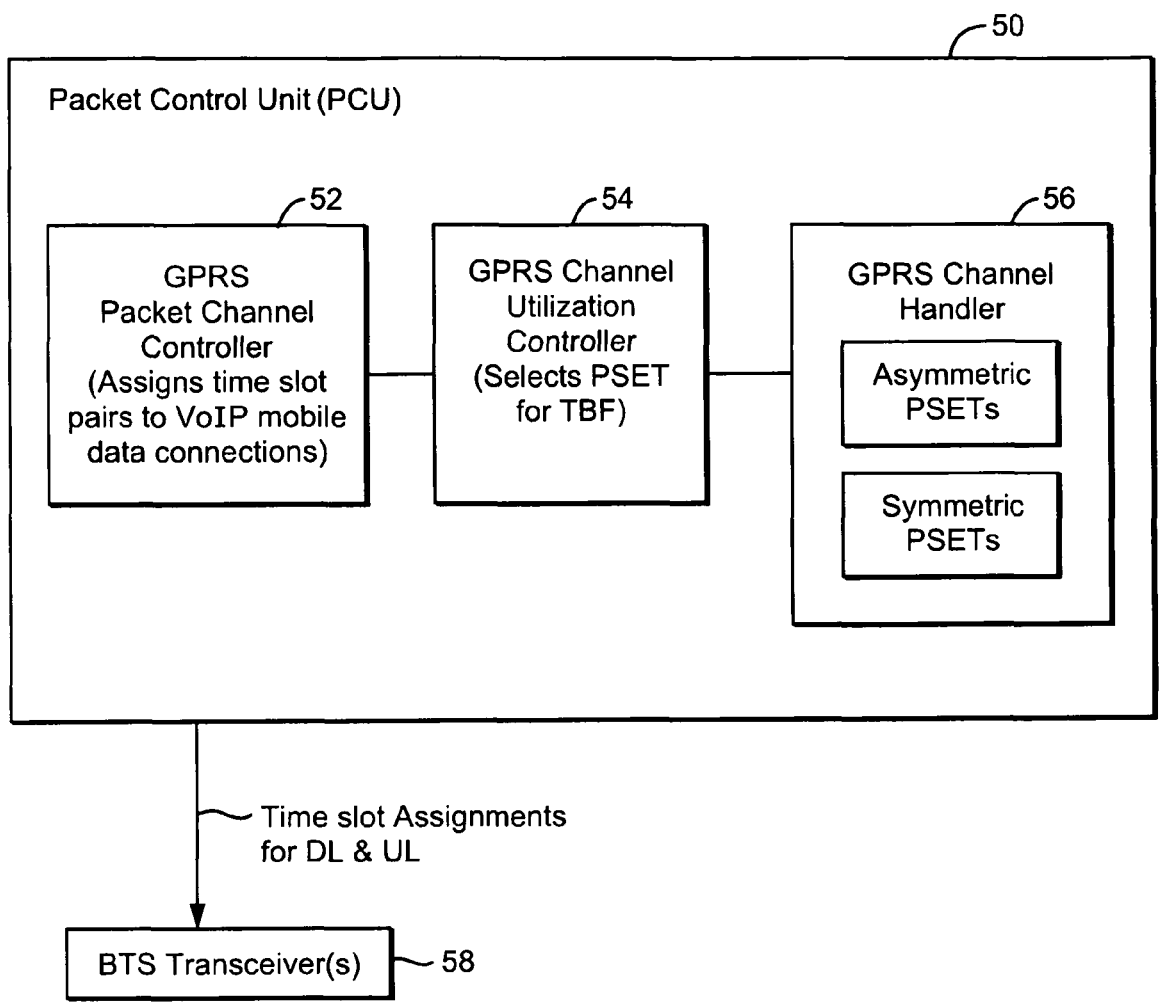
FIG. 5 is a simplified function block diagram of a non-limiting example packet control unit for implementing the flowchart steps or actions outlined in FIG. 2 in the context of a non-limiting GPRS/EDGE-based system.

FIG. 5 shows a packet control unit (PCU) 50, typically found in the BSC 26, for controlling each packet flow including establishing TBFs, selecting PSETs, and managing time slots. As explained above, the Medium Access Control (MAC)-protocol layer implemented by the GPRS packet channel controller 52 multiplexes concurrent TBFs onto the radio interface. Every 20 milliseconds, the approximate duration for a radio block to be sent, a new scheduling decision has to be made for the PSET.

Normally in GPRS/EDGE, there is just one PSET. But in this example implementation, rather than just having one PSET, the GPRS channel handler 56 maintains two PSETS: an asymmetric PSET for asymmetrical TBFs and a symmetric PSET for symmetrical TBFs. The GPRS channel utilization controller 54 thus determines the type of data connection requested and then selects the appropriate PSET. For example, a symmetric PSET is selected for a data connection request detected as a VoIP connection. The non-limiting time slot examples below have been simplified to aid in understanding and illustrate the principle rather that a specific implementation. For example, time slot 0 in the uplink is assumed to occur at the same time as time slot 0 in the downlink. But in GSM/GPRS/EDGE systems, this assumption is not necessarily true. The naming convention in GSM is that time slot 0 in the uplink occurs three (3) time slots after time slot 0 in the downlink.

For an asymmetric PSET, the GPRS packet channel controller 52 can employ conventional time slot allocation schemes tailored for asymmetric services. For example, more time slots might be assigned for data flows having a higher quality of service requirement. Time slot assignments are conveyed to the appropriate BTS transceiver 58 for communication with the mobile.

But for a symmetric PSET, which would be selected for VoIP data connections, the GPRS packet channel controller 52 assigns time slots using a VoIP mobile "pairs" approach to create a paired symmetrical PSET. Two VoIP mobiles in a cell associated active VoIP data connections are "paired." Typically, they are different connections where each mobile is talking to a different party, but they could be the same connection where the paired mobiles are talking to each other. For example, the uplink timeslot allocation for a first VoIP mobile (MS1) in the pair is the same timeslot allocation for a second VoIP mobile (MS2) in the downlink. The following example illustrates this pairing for four VoIP mobile users MS1-MS4.

First Pair:
MS 1: DL on TS 0, UL on TS 1
MS 2: DL on TS 1, UL on TS 0
Second Pair:
MS 3: DL on TS 2, UL on TS 3
MS 4: DL on TS 3, UL on TS 2

Figure 6B:
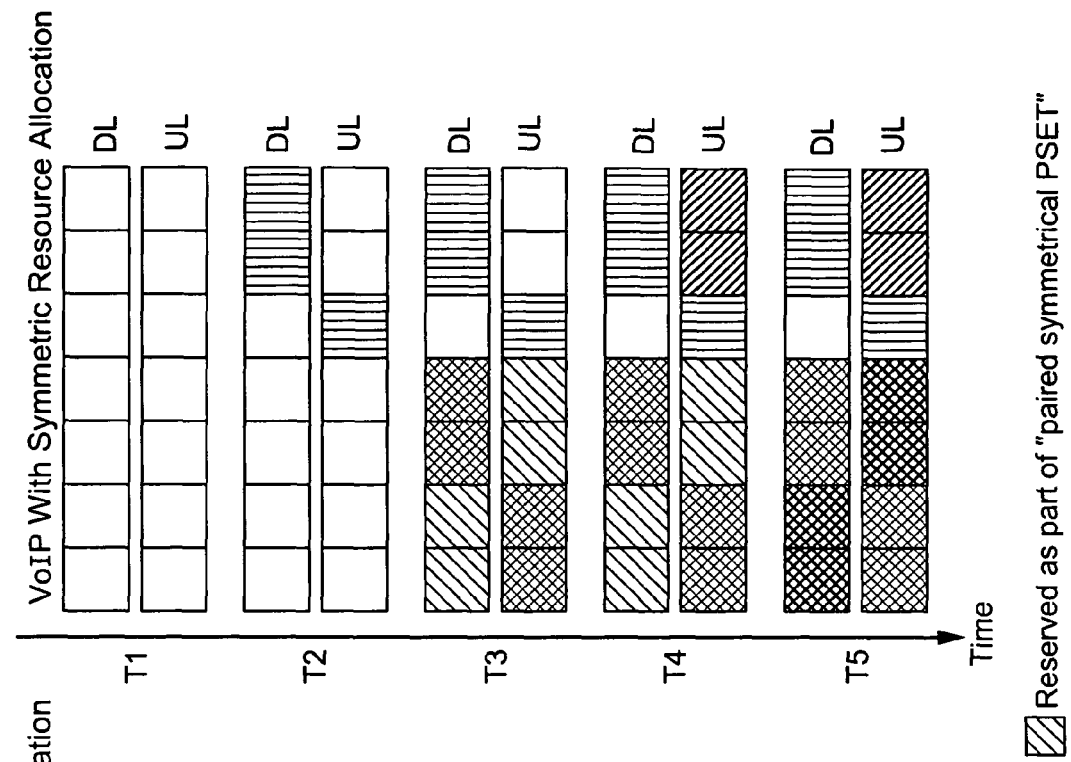
FIG. 6 is a diagram illustrating an example implementation in a GSM/EDGE implementation where
Figure 6A:
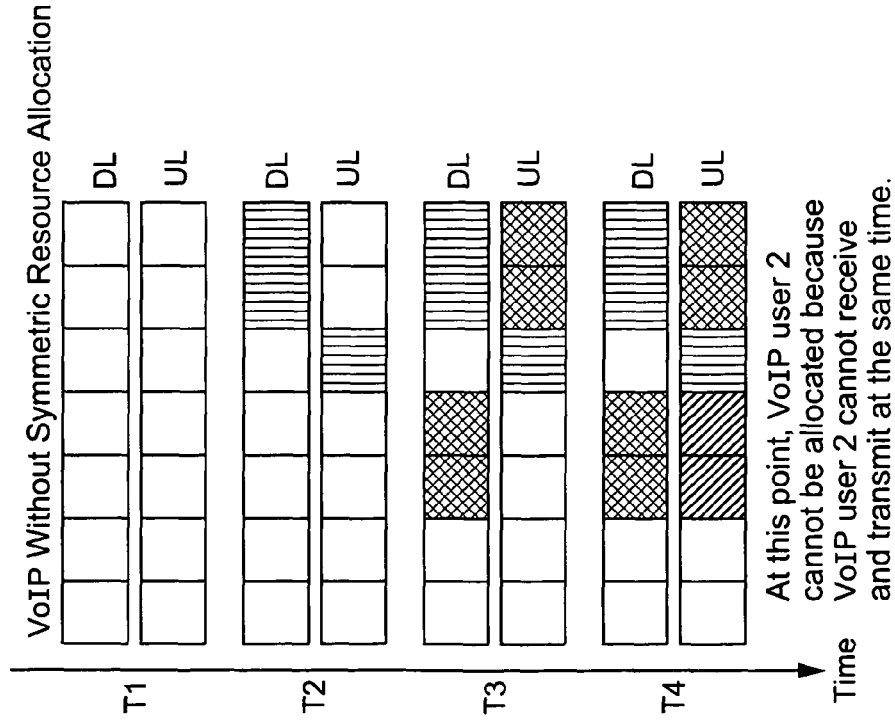

An advantage of this pairing approach is demonstrated using FIG. 6. FIG. 6A shows a progression in time of time slot allocations for VoIP data connections without taking into account the need to possibly allocate resources symmetrically. Each pair of rows of time slots corresponds to time slots available for allocation in the downlink direction (top row) and time slots available in the uplink direction (bottom row). The arrow indicates time slot allocations as a function of increasing time. At time T1, no time slots are allocated in the uplink or downlink. At time T2, time slots 7 and 8 for the downlink are assigned to a data user A requesting an asymmetric service, and time slot 5 is assigned for that asymmetric data user A for the uplink. At time T3, time slots 3 and 4 for the downlink are assigned to a VoIP user 1 requesting a symmetric VoIP service, and time slots 7 and 8 are assigned for that VoIP user 1 for the uplink. At time T4, a data user B requesting an asymmetric service is assigned time slots 3 and 4 for the uplink. As a result of the way in which the time slots were allotted, at a next time T5, a VoIP user 2 requiring two time slots in both the uplink and the downlink cannot be serviced because only time slots 1 and 2 are available and VoIP user 2 cannot receive and transmit at the same time using the same time slots 1 and 2.

In contrast, FIG. 6B shows that by using the pairing allocation method described above when assigning time slots to symmetric users like VoIP users, the available time slots can be used much more efficiently. At time T3, pairs of time slots are allocated and reserved for VoIP users. VoIP user 1 is assigned time slots 3 and 4 in the downlink and time slots 1 and 2 in the uplink. At the same time, time slots 1 and 2 in the downlink and 3 and 4 in the uplink are reserved for a future VoIP user 2 to be paired with VoIP user 1. In this example, time slots 1 and 2 in the downlink and time slots 3 and 4 in the uplink and time slots 3 and 4 in the downlink and time slots 1 and 2 in the uplink make up a paired symmetrical PSET. Then at time T4, another asymmetric data user B is assigned time slots 7 and 8 in the uplink. When VoIP user 2 then needs two time slots at time T5, the reserved time slots 1 and 2 in the downlink and 3 and 4 in the uplink are available and are assigned. The more efficient allocation of time slots is evident in FIG. 6B.

The GPRS packet channel controller 52 thus optimizes use of the time slot resources by reserving and allocating time slots in pairs, rather than allocating individual time slots to individual mobile users. Although different optimization procedures to assign time slots to mobile pairs may be used, one example optimization approach is to start from the rightmost time slot position (the highest time slot number) and try to fit the mobile pair into that rightmost time slot position. If that is not possible, the next time slot to the left is included to determine if the mobile pair fits. This process continues until a fit is achieved.

While most mobile terminals have the capability of receiving downlink data on 4 or even 5 timeslots simultaneously, normally that limits the mobile's capability of sending data uplink to 1 timeslot. Similarly, while a mobile terminal may have the capability to transmit on 3 time slots on the uplink simultaneously, that may impair the mobile's ability to receive on more than on timeslot simultaneously. So instead of utilizing the mobile terminal's maximum unidirectional capacity in the time slot allocation for the symmetrical services, the symmetrical allocation will only use time slot allocation combinations that result in symmetrical transfer speed, such a 1 time slot in the uplink and 1 time slot in the downlink, or time slots in the uplink and 2 time slots in the downlink.

In a further (optional) refinement, mobiles are paired based on similar radio conditions. To help illustrate this, consider a third pair of VoIP mobiles MS5 and MS6 in addition to the first and second mobile pairs MS1, MS2 and MS3, MS4 set forth above:
MS 5: DL on TS 4+5, UL on TS 6+7
MS 6: DL on TS 6+7, UL on TS 4+5

For example, if a detected radio condition, e.g., a carrier-to-interference ratio C/I, is favorable for MSs 1-2, relatively favorable for MSs 3-4, and less favorable for MSs 5-6, MS's 5 and 6 will require more timeslots in each direction (uplink and downlink) to compensate for the poor radio conditions that decrease the effective throughput per time slot. By pairing based on C/I, the scheduler can work around the fact that some mobile pairs may require, for example, 1 time slot in each direction, while other mobile pairs may require 2 time slots in each direction.

Optimizing the utilization of the available timeslots is a very complex task. Nevertheless, even small improvements in the utilization percentage result in substantial benefits because a more efficient allocation increases the data capacity of the operator's entire radio network. By noting that symmetrical services like VoIP require both uplink and downlink channels during at least the majority of the connection time and that GPRS/EDGE mobiles cannot receive and send data at the same time, the inventors determined that by pairing a first VoIP user on the uplink with a second VoIP user on the downlink for the same time slot(s), they can guarantee that both uplink and downlink resources are available throughout the conversations for the first and second VoIP users.

The uplink flow of data for a VoIP mobile is still handled as an uplink TBF by the system and the mobile station, The downlink flow of data to that VoIP mobile is still handled as a downlink TBF by the system and the mobile station. This enables reuse of other TBF setup, maintenance, and handling mechanisms in GPRS/EDGE that are still applicable.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. It is to be understood that the invention is not to be limited to the disclosed embodiment, but on the contrary, is intended to cover various modifications and equivalent arrangements. For example, claimed references to paired time slots include direct time slot number pairing as well as offset time slot number pairing between uplink and downlink time slots.

What is claimed is:

1. A method for allocating radio channel resources in a radio communications system having a network with a network node, where the network node and a mobile radio station communicate over a radio interface, comprising:
   the network node determining whether a data communication requested between the network and the mobile radio station is associated with a symmetric service or an asymmetric service;
   if the data communication is associated with a symmetric service, the network node establishing a symmetric data connection between the mobile radio station and the network for communicating data packets associated with the data communication; and
   the network node assigning substantially the same amount of radio channel resources to the symmetric connection for transporting data packets uplink from the mobile radio station to the network as for transporting data packets downlink from the network to the mobile radio station,
   wherein the symmetric data communication is a voice over IP (VoIP) communication and the radio communications system is a GPRS or EDGE type system, the radio channel resources are time slots, and the symmetric VoIP connection includes an uplink temporary block flow (TBF) and a downlink TBF,
   wherein for multiple mobile radio stations in a cell each associated with a VoIP data communication, the method further comprising:
   pairing VoIP data communications when assigning time slots,
   assigning a first VoIP data communication in a pair to a first time slot in which to transmit and a second time slot in which to receive, and
   assigning a second VoIP data communication in the pair to the first time slot in which to receive and the second time slot in which to transmit.

2. The method in claim 1, further comprising:
   limiting an amount of resources assigned in the uplink and/or downlink directions for the symmetric data connection even though the mobile radio station has a capability for transmitting and/or receiving more resources than the limited amount in one or both of the uplink and downlink directions.

3. The method in claim 1, wherein to make available time slots for multiple symmetric VoIP communications, the method further comprises:
   performing timeslot scheduling for the symmetric VoIP communications taking into account that substantially the same amount of radio channel resources will be used in the uplink direction as in the downlink direction in each of the symmetric data communications.

4. The method in claim 1, further comprising:
   determining a radio condition associated with at least one of the uplink and downlink data flows for each of multiple VoIP connections;
   pairing together VoIP connections having a similar associated radio condition; and
   determining a same number of timeslots to be assigned for each pair of VoIP connections based on the determined radio condition.

5. The method in claim 1, further comprising:
   determining a radio condition associated with at least one of the uplink and downlink data flows for multiple VoIP communications;
   determining a same number of time slots to be assigned to both the uplink and downlink based on the determined radio condition for each of the VoIP communications; and
   grouping the VoIP communications having the same number of determined timeslots into pairs for purposes of assigning time slots,
   wherein for a pair of VoIP communications having a superior determined radio condition, a first number of time slots are assigned, and for a pair of VoIP communications having an inferior determined radio condition, more than the first number of time slots are assigned.

6. A network node for allocating radio channel resources in a radio communications system having a network with the network node, where the network node and a mobile radio station communicate over a radio interface, the network node comprising:
   means for determining whether a voice over IP (VoIP) data communication requested between the network and the mobile radio station is associated with a symmetric service or an asymmetric service;
   means for establishing a symmetric data connection between the mobile radio station and the network for communicating data packets associated with the VoIP data communication if the data communication is associated with a symmetric service; and
   means for assigning radio channel resources to the symmetric connection for transporting the data packets between the mobile radio station and the network,
   wherein the symmetric connection is assigned substantially the same amount of radio channel resources in an uplink direction as in a downlink direction,
   wherein the radio communications system is a GPRS type system, the radio channel resources are time slots, and the symmetric connection includes an uplink temporary block flow (TBF) and a downlink TBF,
   wherein for multiple mobile radio stations in a cell each associated with a VoIP data communication, the network node further comprises:
   means for pairing VoIP data communications when assigning time slots including assigning a first VoIP data communication in a pair a first time slot in which to transmit and a second time slot in which to receive and assigning a second VoIP data communication in the pair the first time slot in which to receive and the second time slot in which to transmit.

7. The network node in claim 6, further comprising:
   means for limiting an amount of resources assigned in the uplink and/or downlink directions for the symmetric data connection even though the mobile radio station has a capability for transmitting and/or receiving more resources than the limited amount in one or both of the uplink and downlink directions.

8. The network node in claim 6, wherein for multiple symmetric VoIP communications, the network node further comprising:
   means for performing timeslot scheduling for the symmetric VoIP communications taking into account that substantially the same amount of radio channel resources will be used in the uplink direction as in the downlink direction in each of the symmetric VoIP communications.

9. The network node in claim 6, further comprising:
means for determining a radio condition associated with at least one of the uplink and downlink data flows for multiple VoIP communications;
means for pairing together VoIP communications having a similar associated radio condition; and
means for determining a same number of time slots to be assigned for each pair of the VoIP communications based on the determined radio condition for each of the VoIP communications,
wherein for a pair of VoIP communications having a superior determined radio condition, the means for grouping is configured to assign a first number of time slots, and for a pair of VoIP communications having an inferior determined radio condition, the means for grouping is configured to assign more than the first number of time slots are assigned.

10. A network node for allocating radio channel resources in a radio communications system having a network with the network node, where the network node and a mobile radio station communicate over a radio interface, the network node comprising data processing circuitry configured to:
determine whether a data communication requested between the network and the mobile radio station is associated with a symmetric service or an asymmetric service;
establish a symmetric data connection between the mobile radio station and the network for communicating data packets associated with the data communication if the data communication is associated with a symmetric service; and
assign radio channel resources to the symmetric connection for transporting the data packets between the mobile radio station and the network in accordance with a symmetric connection resource allocation scheme that differs from an asymmetric connection resource allocation scheme,
wherein:
the symmetric data connection includes substantially the same amount of radio channel resources in an uplink direction as in a downlink direction,
the symmetric data communication is a voice over IP (VoIP) communication,
the radio communications system is a GPRS or EDGE type system, the radio channel resources are time slots, and the symmetric connection includes an uplink temporary block flow (TBF) and a downlink TBF,
for multiple mobile radio stations in a cell each associated with a VoIP data communication, the data processing circuitry is configured to pair VoIP data communications when assigning time slots, and
the data processing circuitry is configured to assign a first VoIP data communication in a pair to a first time slot in which to transmit and a second time slot in which to receive, and assign a second VoIP data communication in the pair to the first time slot in which to receive and the second time slot in which to transmit.

11. The network node in claim 10, wherein an amount of resources assigned in the uplink and/or downlink directions for the symmetric connection is limited even though the mobile radio station has a capability for transmitting and/or receiving more resources than the limited amount in one or both of the uplink and downlink directions.

12. The network node in claim 10, wherein network node is a base station.

13. The network node in claim 10, wherein network node is a base station controller.

14. The network node in claim 10, wherein for multiple symmetric VoIP communications, the data processing circuitry is configured to perform timeslot scheduling for the symmetric VoIP communications taking into account that substantially the same amount of radio channel resources will be used in the uplink direction as in the downlink direction in each of the symmetric VoIP communications.

15. The network node in claim 10, wherein the data processing circuitry is configured to:
determine a radio condition associated with at least one of the uplink and downlink data flows for each of multiple VoIP connections;
pair together VoIP connections having a similar associated radio condition; and
determine a same number of timeslots to be assigned for each pair of VoIP connections based on the determined radio condition.

16. The network node in claim 15, wherein the data processing circuitry is configured to:
determine a radio condition associated with at least one of the uplink and downlink data flows for multiple VoIP communications;
determine a same number of time slots to be assigned to both the uplink and downlink based on the determined radio condition for each of the VoIP communications; and
group the VoIP communications having the same number of determined timeslots into pairs for purposes of assigning time slots, and
wherein for a pair of VoIP communications having a superior determined radio condition, the data processing circuitry is configured to assign a first number of time slots, and for a pair of VoIP communications having an inferior determined radio condition, the data processing circuitry is configured to assign more than the first number of time slots.

* * * * *

UNITED STATES PATENT AND TRADEMARK OFFICE
CERTIFICATE OF CORRECTION

| | | |
|---|---|---|
| PATENT NO. | : 7,801,105 B2 | Page 1 of 1 |
| APPLICATION NO. | : 11/288436 | |
| DATED | : September 21, 2010 | |
| INVENTOR(S) | : Larsson et al. | |

It is certified that error appears in the above-identified patent and that said Letters Patent is hereby corrected as shown below:

On the Face Page, in Field (75), under "Inventors", in Column 1, Line 2, delete "Bäckstrom," and insert -- Bäckström, --, therefor.

On the Face Page, in Field (58), under "Field of Classification Search", in Column 1, Line 1, delete "370/227,".

On Page 2, in Field (56), under "OTHER PUBLICATIONS", in Column 2, Line 18, delete "State" and insert -- Stage --, therefor.

In Fig. 2, Sheet 2 of 5, for Tag "S3", in Line 2, after "of", insert -- data --.

In Column 4, Line 8, delete "where" and insert -- . --, therefor.

In Column 8, Line 54, delete "station," and insert -- station. --, therefor.

Signed and Sealed this
Thirty-first Day of July, 2012

David J. Kappos
*Director of the United States Patent and Trademark Office*